US006989106B2

(12) United States Patent
Meisel et al.

(10) Patent No.: US 6,989,106 B2
(45) Date of Patent: Jan. 24, 2006

(54) PROCESS FOR THE PREPARATION OF POLYMERIC CONDENSATES AND THEIR USE

(75) Inventors: Karlheinrich Meisel, Odenthal (DE); Lars Obendorf, Köln (DE); Branislav Boehmer, Salzweg-Strasskirchen (DE); Bernd Thiele, Odenthal (DE); Armin Spaniol, Bergisch Gladbach (DE); Dietmar Fuchs, Pulheim (DE); Gerd-Friedrich Renner, Kürten (DE); Thomas Huebbe, Kürten (DE)

(73) Assignee: Bayer Aktiengesellschaft, Leverkusen (DE)

( * ) Notice: Subject to any disclaimer, the term of this patent is extended or adjusted under 35 U.S.C. 154(b) by 85 days.

(21) Appl. No.: 10/457,262

(22) Filed: Jun. 9, 2003

(65) Prior Publication Data

US 2004/0039152 A1 Feb. 26, 2004

(30) Foreign Application Priority Data

Jun. 7, 2002 (DE) ............................... 102 25 349
Mar. 10, 2003 (DE) ............................... 103 10 287

(51) Int. Cl.
*C14C 9/00* (2006.01)
*A61K 7/06* (2006.01)
*C08G 85/00* (2006.01)

(52) U.S. Cl. ..................... 252/8.83; 528/322; 528/332; 528/335; 528/367; 528/422; 528/424; 526/67; 424/70.1; 424/70.11; 424/401; 252/8.84; 525/420; 525/423; 525/424

(58) Field of Classification Search ................ 528/322, 528/332, 335, 367, 422, 424; 526/67; 424/70.1, 424/70.11, 401; 252/8.83, 8.84; 525/420, 525/423, 424
See application file for complete search history.

(56) References Cited

U.S. PATENT DOCUMENTS

| 4,533,254 A | 8/1985 | Cook et al. ................. 366/176 |
| 5,977,293 A | 11/1999 | Steuerle et al. ............. 528/424 |
| 6,056,967 A | 5/2000 | Steuerle et al. ............. 424/401 |
| 2002/0169229 A1 | 11/2002 | Hofmann et al. ........... 521/155 |

FOREIGN PATENT DOCUMENTS

| EP | 411400 A | 2/1991 |
| WO | 9961511 | 12/1999 |
| WO | 00/67884 | 11/2000 |
| WO | 2068502 | 6/2002 |
| WO | 3006529 A | 1/2003 |

*Primary Examiner*—Samuel A. Acquah
(74) *Attorney, Agent, or Firm*—Diderico van Eyl

(57) ABSTRACT

A process for the preparation of polymeric condensates, wherein the reaction mixture is fed at least once during the condensation reaction through a zone of high energy density which has an energy density of at least $10^5$ J/m$^3$.

12 Claims, No Drawings

PROCESS FOR THE PREPARATION OF POLYMERIC CONDENSATES AND THEIR USE

BACKGROUND OF THE INVENTION

1. Field of the Invention

The invention relates to a process for the preparation of polymeric condensates, in particular of aqueous solutions thereof, the products thus obtainable and their use.

2. Brief Description of the Prior Art

In the preparation of polymeric condensates in which the low molecular weight fractions are ineffective or only of little effect for the desired application, there is a continuing attempt to increase the fraction of higher molecular weight, effective polymers at the expense of the ineffective, low molecular weight polymers. A possible method for doing so is to subject these low molecular weight condensates to further condensation.

However, the disadvantage of this method is that, with the inevitably resulting distribution of the molecular weights, there is formed very high molecular weight polymers which no longer have an activity since they tend to gel and/or precipitate. The latter properties make the polymer mixture unusable to a high degree.

The prior art has often described a method in which condensation is operated up to the beginning of gelling or of precipitation, and the polymer mixture obtained is then freed from the ineffective, low molecular weight polymer fraction by means of membrane filtration (cf. WO-A 00/67 884, DE-A-19 600 366, U.S. Pat. No. 6,056,967 and EP-A-873 371). The low molecular weight fraction separated off can then be recycled to a polycondensation.

The disadvantage of this procedure is, inter alia, the wastewater load produced. It was therefore the object to provide an alternative preparation process for polycondensates without the disadvantages of the prior art.

SUMMARY OF THE INVENTION

A process for the preparation of polymeric condensates has now been found, wherein the reaction mixture for the preparation of the condensates is fed at least once during the condensation reaction through a zone which has an energy density of at least $10^5$ J/m$^3$.

The condensates preferably prepared by the process according to the invention are polycations and preferably have an average molar mass of from 0.7 to 1.5 million g/mol.

The process according to the invention can be used for the preparation of anionic, neutral or cationic products. It can be carried out continuously or batchwise.

The provision of a correspondingly high energy density can be realized, for example, by removing the reaction mixture continuously via a bypass, passing it through the zone of high energy density and then recycling it to the reaction.

DETAILED DESCRIPTION OF THE INVENTION

The following is a more detailed but non-limiting description of the invention. It is preferable if the reactor volume is circulated at least once. It is particularly preferable to circulate the reactor volume at least 4 times. It is advantageous to remove the energy supplied for providing the necessary energy by means of a heat exchanger in the bypass. It is particularly preferable to install this heat exchanger upstream of the mixing unit so that the reaction medium is cooled upstream of the zone of high energy density.

It is particularly advantageous if the reaction component required for the polycondensation is metered into the bypass. In this variant, reaction temperature and temperature in the zone are preferably established by means of flow-through heat exchangers.

It is also possible to mount a mixing unit which ensures the required energy introduction in a reactor. In this variant, the energy supplied can be removed either by cooling of the vessel jacket or by additionally mounted immersion coolers.

It is preferable to connect a cascade of reactors in series and to carry out the condensation in the first reactor of the cascade, as customary in a batch reaction, to pass the reaction mixture, with introduction of a large quantity of energy, into the second reactor and to continue the reaction there, optionally with addition of further amounts of starting materials. The removal of the energy introduced can be effected either by means of a heat exchanger upstream and/or downstream of the mixing unit or by cooling of the vessel jacket or by means of an immersion cooler.

This procedure can be repeated over further reactors of the cascade.

Suitable mixing units are distinguished by the fact that, owing to their geometry, they introduce a high local energy density in the form of flow energy into the product. Since high pressures are frequently used for this task, these mixing units are also referred to as high-pressure homogenizers. Mixing units which are particularly suitable for such tasks are static mixers and/or nozzle units. Particularly suitable are simple orifice plates, fan nozzles, serrated nozzles, knife edge nozzles, microfluidizers, as described in U.S. Pat. No. 4,533,254, microstructured mixers, microstructured components or jet dispersers. Further geometries which operate according to the same principle of these or other nozzle units are readily accessible to a person skilled in the art. The principle of operation of these nozzle units may be explained using a simple orifice plate as an example. The product stream is subjected to pressure by means of a pump and is let down through the orifice. Owing to the sudden cross sectional constriction, the product stream is greatly accelerated in the nozzle. Depending on the geometry of the orifice, two types of forces can act on the product. Either the product stream is accelerated to such an extent that the flow in the nozzle is turbulent or, in the case of laminar flow, so-called extensional flow is generated in the nozzle.

FIG. 1 to 5 of DE-A 10 108 484 show further examples of suitable nozzle units. FIG. 1 shows a fan nozzle and FIG. 2 shows a knife edge nozzle, while a microfluidizer is shown in FIG. 3. A serrated nozzle is formed in FIG. 4 and a jet disperser is shown in FIG. 5.

In addition to these mixing units which introduce a high energy density in the form of flow energy into the product, those apparatuses which introduce a high energy density by means of rotating parts are also suitable, such as, for example, rotorstator systems, ball mills, colloid mills, wet rotor mills, gear-type dispersing apparatuses, intensive mixers which make use of the principle of the gear-type dispersing apparatuses but through which the flow is in the axial direction, or other apparatuses which use rotating parts, are easily accessible to a person skilled in the art and can be used for the object set.

Those mixing units which, like, for example, ultrasonic disintegrators, generate high energy densities by cavitation may furthermore be mentioned. Cavitation is understood as meaning the formation and collapse of vapor bubbles in a liquid in which there is initially an isothermal pressure drop to the vapor pressure of the liquid and after which the pressure increases again. As a result of the pressure increase, the gas bubbles formed collapse again. In the collapsing process, the energy effective with respect to comminution is liberated. By adding a liquid having a suitable vapor pressure, it is therefore also possible to achieve the required energy density in the reaction product in this manner.

In addition, combinations of said or similar mixing units can also be used.

It has been found that it is preferable for the preparation of polymeric condensates by the process according to the invention if certain minimum values for energy density and preferably also total residence times (product of residence time per pass and number of passes) in the mixing unit are at least maintained.

The energy density $E_v$ is determined in the case of the nozzle units by the pressure difference effective at the nozzle (homogenization pressure) $\Delta p_H$:

$$E_v[J/m^3]=]\Delta p_H$$

For mixing units which operate according to the principle of the rotor-stator systems, the energy density can be determined experimentally from the power P introduced, the density $\rho$, the volume $V_{sp}$ effective with respect to dispersing and the residence time t in this volume:

$$E_v[J/m^3]=P\times\rho^{-1}\times V_{sp}^{-1}\times t$$

The preferred shear energies are preferably at least $7.5\times10^6$ J/m$^3$, in particular at least $1\times10^7$ J/m$^3$. Nozzles having hole diameters of from 0.1 mm to 5.0 mm, in particular from 0.1 to 2.0 mm, are preferably used.

The residence time of the product in the corresponding zones having high energy densities is preferably at least $1\times10^{-6}$ seconds, in particular from $1\times10^{-5}$ to 1 second. The condensate or the reaction mixture is preferably passed once through at least one zone having high energy density. As a rule, however, a plurality of passes through the mixing unit are realized.

A preferred solvent for the process according to the invention is water, but the process is in principle independent of the solvent.

The large quantity of energy is preferably introduced at the reaction temperature but can also be introduced at another temperature. It is preferably introduced at from 20° C. to 150° C.

In the process according to the invention, condensates preferably chosen are water-soluble (preferably >1 g/l at 20° C.) compounds which contain amino groups and which may be condensates of alkylenediamines, of polyalkylenepolyamines, of polyamidoamines, of polyamidoamines grafted with ethyleneimine and of mixtures thereof with crosslinking agents having at least two functional groups, condensates of Michael adducts of polyalkylenepolyamines, Michael adducts of polyamidoamines and Michael adducts of polyamidoamines grafted with ethyleneimine and mixtures thereof and monoethylenically unsaturated carboxylic acids and salts, esters, amides or nitriles thereof with crosslinking agents having at least two functional groups, amidated polyethyleneimines which are obtainable by reaction of polyethyleneimines with monobasic carboxylic acids or their esters, anhydrides, acid chlorides or acid amides and optionally condensation of the amidated polyethyleneimines with crosslinking agents having at least two functional groups, polyethyleneimines, quatemized polyethyleneimines, phosphonomethylated polyethyleneimines, alkoxylated polyethyleneimines and/or polyethyleneimines carboxymethylated by a Strecker reaction and crosslinked alkoxylated polyethyleneimines, crosslinked, quatemized polyethyleneimines, crosslinked phosphonomethylated polyethyleneimines and/or crosslinked polyethyleneimines carboxymethylated by a Strecker reaction.

Cationic polyethyleneimines or polyamidoamines which are obtainable by reaction of a) polyamines containing ethylene groups or the reaction products thereof with organic, in particular aliphatic or aromatic, dicarboxylic acids or derivatives thereof, in particular anhydrides, esters or acid halides, aliphatic or aromatic diisocyanates or alkylene oxides, in particular ethylene oxide or propylene oxide, with b) amine crosslinking agents, in particular 1,2-dichloroethane, 1,2-dibromomethane, 1,3-dibromopropane, 1-chloro-3-bromopropane and epichlorohydrin, are also preferably prepared as condensates by the process according to the invention.

A preferably used polyamine of component a) is one of the formula (I)

$$H_2N-A-NH_2 \qquad (I),$$

in which
A is a bivalent radical of the formula $$-(CH_2CH_2N(R))_nCH_2CH_2-$$

in which n=0 to 50 and R, independently of each repeating unit n, is H, $CH_2CH_2NH_2$, $-CH_2CH_2NRH$ or $-(CH_2CH_2N(R))_q$, in which q is a number from 0 to 50 and R, independently of each repeating unit, may have the above meaning.

Particularly preferred polyamines of component a) are diethylenetriamine, triethylenetetramine, tetraethylenepentamine, pentaethylenehexamine, N-methyl-dipropylenetriamine or more highly condensed, linear or branched components or mixtures of these compounds.

Polyamine mixtures or the corresponding reaction products thereof are also preferred as component a). Particularly suitable polyamine mixtures are those which contain from 20 to 80% by weight of hexamines,
up to 50% by weight of pentamines,
up to 30% by weight of tetramines,
up to 10% by weight of amines which have low volatility and are lower than tetramines, in particular diethylenetriamine, ethylenediamine and aminoethylpiperazine,
from 5 to 20% by weight of heptamines to dodecamines,
up to 30% by weight of amines higher than dodecamines.

Hexamine means pentaethylenehexamine or the correspondingly branched analogs. The other designations follow this system.

Preferred reaction products prepared from the polyamines containing ethylene groups are reaction products of the polyamines with at least bifunctional crosslinking agents with formation of neutral intermediates.

Such bifunctional crosslinking agents may be: aromatic or aliphatic dicarboxylic acids, such as, for example, terephthalic acid, succinic acid, adipic acid, sebacic acid, aromatic or aliphatic diisocyanates, such as, for example, hexamethylene diisocyanate, p-phenylene diisocyanate, ethylene oxide, propylene oxide or compounds having different functional groups, such as, for example, acrylamide or acrylic acid or reaction products of further bifunctional reagents, e.g. of di- or polyamines or of di- or polyethylene glycols, with these crosslinking agents, in which reaction products only one of the two functions has been reacted.

Trifunctional crosslinking agents, such as, for example, cyanuric chloride, triisocyanates or maleic anhydride, are also suitable.

Polyamidoamine reaction products of polyamines with aliphatic dicarboxylic acids are preferred as component a).

The derivatives of the polyamines with dicarboxylic acids, in particular aliphatic $C_3$–$C_{10}$-dicarboxylic acids (such as succinic acid, adipic acid or sebacic acid or aromatic $C_8$–$C_{15}$-dicarboxylic acids, such as terephthalic acid) are understood as being preferred polyamidoamines of component a), adipic acid being particularly preferred.

Preferred polyamidoamines of component a) have the formula (II)

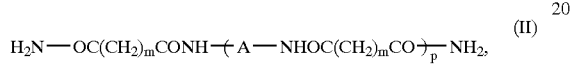

in which
A has the above meaning and
m is from 1 to 8, in particular 4 and
p is a number from 1000 to 10000.

An amine crosslinking agent of component b) is preferably understood as meaning a compound which is capable of crosslinking two amino groups with formation of quaternary salts.

Such crosslinking agents may be, for example, dihaloalkanes, such as 1,2-dichloroethane, 1,2-dibromomethane or 1,3-dibromopropane, or epichlorohydrin or the reaction products of these bifunctional reagents with components used as a bridge segment, e.g. di- or polyamines or di- or polyglycols, with these crosslinking agents in which reaction products only one of the two functions have been reacted.

Also preferred as condensates are condensates based on
A) aldehydes and/or ketones and optionally
B) one or more compounds selected from the group consisting of the unsulfonated aromatics, urea and urea derivatives.

The invention furthermore relates to condensates obtainable by the process according to the invention.

The invention furthermore relates to the use of the condensates according to the invention or of the condensates obtained by the process according to the invention as retention aids, filtration aids, drainage aids and fixing agents in papermaking, as wet strength agents for paper, as promoters in the sizing of paper with alkyldiketenes or alkylsuccinic anhydrides, as flocculants for sewage sludges, as adhesion promoters in the production of laminated films, as additives in hair and skin care compositions, as compositions for immobilizing anionic active ingredients and as compositions for improving the fastness of textile dyeings.

The invention is further described by the following non limiting examples.

EXAMPLE

Example 1 a) 1053 g of an amine mixture comprising 10% of tetraethylenepentamine, 5% of triethylenetetramine, 47% of pentaethylenehexamine, 13% of higher boiling amines and 25% of nonvolatile amines are condensed with 461.3 g of adipic acid at an increasing temperature up to 170° C. with removal of water of reaction by distillation.

The polyamidoamine thus formed is discharged onto 1514 g of water and transferred to a pressure-resistant reactor.

b) 585 g of the amine solution from Example 1a) are diluted with 470 g of water and condensed with about 15 g of dichloroethane at a reaction temperature of from 100° C. to 130° C. The dichloroethane is metered in in about 6 hours so that a resulting increase in viscosity can be easily observed. As soon as a sharp increase in the viscosity occurs, the metering is stopped. Excess dichloroethane is removed by letting down the excess pressure. For removal of all components having a low volatility, the reaction mixture is transferred to a preevacuated reactor. The water distilled off is added again after cooling. A pale yellow solution having a solids content of 30% and a viscosity of about 500 mPa·s is obtained.

c) The reaction product from example 1b is forced at a pressure of 500 bar through a nozzle having a diameter of 0.2 mm. During this procedure, the viscosity decreases to a value of about 250 mPa·s. The sheared product is condensed again at 120° C. with dichloroethane to a viscosity of 500 mPa·s.

d) The reaction product from example 1c is also subjected to the procedure described under c).

e) The procedure under c) is repeated 4 times in each case with the reaction mixture obtained from the respective preceding stage.

Example 2

The efficiency of the performance of the polymers prepared according to examples 1b) to 1e) was determined in a generally known manner by measurement of the acceleration of the drainage rate.

A pulp having a consistency of 3 g/l was prepared from 100 parts of unprinted waste paper having a filler content of 10%. The filler used was 10% of china clay grade B. A further additive was 0.5% of alum. The pH of the pulp was 7.2. The paper stock was divided into a plurality of portions, to each of which 0.1%, 0.2%, 0.3%, 0.4%, 0.5% and 0.6% of retention aid were then added. The acceleration of the drainage rate of the 6 concentrations was arithmetically averaged to give a "total efficiency". Example 1a is the reference sample here and was set at 100%.

| | |
|---|---|
| Example 1a | 100% |
| Example 1b | 117% |
| Example 1c | 124% |
| Example 1d | 126% |
| Example 1e | 131% |
| Example 1e (repeated twice) | 135% |
| Example 1e (repeated three times) | 138% |
| Example 1e (repeated four times) | 142% |

It is clearly found that the efficiency of the drainage aids can be substantially improved by the process according to the invention.

Example 3

In a cascade of 7 reactors which are equipped with a metering facility for dichloroethane and an online viscosity measurement, a 24% strength solution of a polyamidoamine melt according to example 1a is pumped continuously at a metering rate of 0.9 liter/hour. The reaction temperature in all reactors is kept at 120° C. At the same time, dichloroethane is metered into the reactors. The metering rate is regulated so that a viscosity of from 200 mPa·s to 400 mPa·s is established. On transferring the reaction mixture into the next vessel, said mixture is forced in each case at a pressure of at least 300 bar through a nozzle system having a hole diameter of 0.2 mm. In the third and in the seventh reactor, 150 ml per hour of water are additionally metered in.

After passage through the seventh reactor, devolatilization is effected into a preevacuated collecting container. The unconverted dichloroethane distilled off azeotropically can be recycled to the process. The solids content of the end product is adjusted to 20%.

A product having a relative efficiency of 140% is obtained.

Comparative Example 4

If the reaction product from example 1b is subjected to a membrane filtration, products having a comparable increase in activity are obtained.

| Membrane | Solids content | Efficiency |
| --- | --- | --- |
| Ceramic 0.2 μm | 8.6% | 135% |
| 3915 0.4 μm | 9.2% | 137% |
| FP 200 | 12% | 142% |

In order to reduce the viscosity, the membrane filtration was carried out at a temperature of 60° C.

To avoid clogging of the membrane, the product had to be diluted to a concentration of 15% before the membrane filtration. 8.6 kg of final concentrate having a concentration of 12.7% and 50 kg of permeate having a concentration of 3.8% were obtained from 20 kg of starting material.

Before the permeate is recycled to a further condensation according to example 1b, it must be concentrated again to a concentration of 25%. About 45 kg of wastewater are obtained thereby.

Although the invention has been described in detail in the foregoing for the purpose of illustration, it is to be understood that such detail is solely for that purpose and that variations can be made therein by those skilled in the art without departing from the spirit and scope of the invention except as it may be limited by the Claims.

What is claimed is:

1. A process for the preparation of polymeric condensates, comprising feeding a condensation reaction mixture at least once during the condensation reaction through a zone of high energy density which has an energy density of at least $10^5$ J/m$^3$,
   wherein the process has a reaction temperature ranging from 20 to 150° C.

2. The process as claimed in claim 1, wherein the zone of high energy density is passed through at least two times.

3. The process as claimed in claim 1, wherein the energy density is at least $7.5 \times 10^6$ J/m$^3$.

4. The process as claimed in claim 1, wherein the energy density is at least $1 \times 10^7$ J/m$^3$.

5. The process as claimed in claim 1, wherein the condensates are water-soluble compounds which contain amino groups.

6. The process as claimed in claim 1, wherein the condensates are water-soluble compounds and the water-soluble compounds which contain amino groups are selected from the group consisting of condensates of alkylenediamines, of polyalkylenepolyamines, of polyamidoamines, of polyamidoamines grafted with ethyleneimine and of mixtures thereof with crosslinking agents having at least two functional groups, condensates of Michael adducts of polyalkylenepolyamines, Michael adducts of polyamidoamines and Michael adducts of polyamidoamines grafted with ethyleneimine and mixtures thereof and monoethylenically unsaturated carboxylic acids and salts, esters, amides or nitriles thereof with crosslinking agents having at least two functional groups, amidated polyethyleneimines which are obtainable by reaction of polyethyleneimines with monobasic carboxylic acids or their esters, anhydrides, acid chlorides or acid amides and optionally condensation of the amidated polyethyleneimines with crosslinking agents having at least two functional groups, polyethyleneimines, quaternized polyethyleneimines, phosphonomethylated polyethyleneimines, alkoxylated polyethyleneimines and/or polyethyleneimines carboxymethylated by a Strecker reaction and crosslinked alkoxylated polyethyleneimines, crosslinked, quaternized polyethyleneimines, crosslinked phosphonomethylated polyethyleneimines and/or crosslinked polyethyleneimines carboxymethylated by a Strecker reaction.

7. The process as claimed in claim 1, wherein cationic polyethyleneimines are obtainable by reacting
   a) polyamines containing ethylene groups or the reaction products thereof with an organic component, selected from the group consisting of aliphatic acids, aromatic acid, mono-acids dicarboxylic acids, and derivatives thereof, with
   b) amine crosslinking agents.

8. The process as claimed in claim 7, wherein the polyamine of component a) used is one of the formula I $$H_2N-A-NH_2 \qquad (I),$$

in which
A is a bivalent radical of the formula $$-(CH_2CH_2N(R))_n CH_2CH_2-$$

in which n=0 to 50 and R, independently of each repeating unit n, is H, $CH_2CH_2NH_2$, $-CH_2CH_2NRH$ or $-(CH_2CH_2N(R))_q$, in which q is a number from 0 to 50 and R, independently of each repeating unit, has the above meaning.

9. The process as claimed in claim 1, wherein the high energy density acts continuously or discontinuously on the reaction mixture.

10. The process as claimed in claim 1, wherein the high energy density is effected at a reaction mixture viscosity of greater than 200 mPa·s.

11. A polymeric condensate obtainable as claimed in claim 1.

12. A process for preparing as filtration aids, drainage aids and fixing agents in papermaking, as promoters in the sizing of paper with alkyldiketenes or alkylsuccinic anhydrides, as flocculants for sewage sludges, as adhesion promoters in the production of laminated films, as additives In hair and skin care compositions, as compositions for Immobilizing anionic active ingredients and as compositions for improving the fastness of textile dyeings by providing the polymeric condensates as claimed in claim 11.

* * * * *